United States Patent
Bae

(10) Patent No.: US 7,171,231 B2
(45) Date of Patent: Jan. 30, 2007

(54) METHOD AND SYSTEM FOR TRANSMITTING SHORT MESSAGES USING SENDING NODE GROUPING

(75) Inventor: Su Hyun Bae, Gumpo-shi (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 10/464,670

(22) Filed: Jun. 19, 2003

(65) Prior Publication Data

US 2004/0157627 A1   Aug. 12, 2004

(30) Foreign Application Priority Data

Jun. 21, 2002 (KR) ............... 10-2002-0035034

(51) Int. Cl.
  *H04B 7/00* (2006.01)
(52) U.S. Cl. ..................... 455/522; 455/446
(58) Field of Classification Search ............. 455/446, 455/522, 561, 450, 436; 370/352, 318, 337
See application file for complete search history.

(56) References Cited

U.S. PATENT DOCUMENTS

2002/0045451 A1* 4/2002 Hwang et al. ............... 455/442
2002/0082020 A1* 6/2002 Lee et al. .................... 455/450
2002/0115464 A1* 8/2002 Hwang et al. ............... 455/522

* cited by examiner

*Primary Examiner*—Creighton Smith
(74) *Attorney, Agent, or Firm*—Fleshner & Kim, LLP

(57) ABSTRACT

The present invention relates to methods and systems for transmitting short messages using sending node grouping. A system for transmitting short messages using sending node grouping according to embodiments of the present invention includes: a plurality of sending node groups configured to generate a reconfiguration short message using a plurality of short messages, respectively, and to transmit the reconfiguration short messages; and a central receiving node configured to process communications corresponding to the relevant reconfiguration short messages on the basis of information contained in the reconfiguration short messages.

33 Claims, 6 Drawing Sheets

METHOD AND SYSTEM FOR TRANSMITTING SHORT MESSAGES USING SENDING NODE GROUPING

BACKGROUND OF THE INVENTION

1. Field of the Invention

The present invention relates to methods and systems for transmitting short messages using sending node grouping.

2. Description of the Related Art

For example, the short message service can be a bi-directional data radio paging service in a mobile communication network and a service that transmits data between terminals at a transmission speed of 160 bytes. The short message service transmits and receives messages composed of characters and numbers between terminals or networks. The short message service includes a short message transmission, an urgent message display, a weather-time record, message recognition and the like.

FIG. 1 illustrates the structure of the related art system for transmitting short messages. The related art system for transmitting short messages includes a plurality of sending nodes 10, a plurality of sending terminals 20, a receiving terminal 40 and a central receiving node 30. Each sending node 10 includes a sending generator 11 that generates a short message containing information of the relevant sending node 10, thereby transmitting the short message to the relevant sending terminal 20. Each sending terminal 20 is connected to the relevant sending node 10, receives the short message from the relevant sending node 10 and transmits the short message to the mobile communication network. The receiving terminal 40 receives short messages transmitted from the sending terminals 20 through the mobile communication network. The central receiving node 30 includes a receiving parser 31, connected to the receiving terminal 40, that analyzes short messages transmitted from the receiving terminal 40 and processes calls corresponding to the relevant short messages on the basis of the information contained in the short messages analyzed by the relevant receiving parser 31.

As described above, in terms of communications between sending nodes 10 and a central receiving node 30, the related art system for transmitting short messages includes sending terminals 20 and a receiving terminal 40 and the sending terminals 20 transmit information contained in short messages to the receiving terminal 40. A node indicates every device that can be managed by the manager in the center of a network. For example, various network devices of communication networks, beverage vending machines, taxis and the like can be nodes.

FIG. 2 is a flow chart illustrating the related art method of transmitting short messages. Sending nodes 10 generate short messages containing information about each sending node by using a sending generator 11 provided in each sending node 10 (S201). In other words, the sending nodes 10 transform information about each sending node into short messages by using the sending generator 11 provided in the relevant sending nodes 10. The maximum size of short message is different depending on the mobile communication network. According to the Global System for Mobile communication (GSM) method, 160 bytes is the maximum size of short message that can be transmitted. According to Code Division Multiple Access (CDMA) or Personal Communication Service (PCS) method, 80 bytes is the maximum size of short message that can be transmitted. Hereinafter, an explanation will be given assuming that the size of short message is 80 bytes. However, the invention is not limited to any given size of short message.

FIG. 3 illustrates the structure of the related art short message. The related art short message includes a sending node information field and a data information field. The sending node information field includes a node ID field indicating an inherent value of the sending node 10 and the other information field indicating the other information of the sending node 10. The data information field includes a node data field indicating data transmitted from the sending node 10. The node ID field amounts to 2 bytes that have the capacity for IDs of 65,535 sending nodes 10. It is found that a central receiving node 30 can communicate with 65,535 sending nodes 10. The other information field amounts to about 8 bytes at least and the size of the other information field is variable. The data information field amounts to 70 bytes at most for data transmitted in this example.

After step S201, the sending nodes 10 transmit the short messages generated by the relevant sending generator to the sending terminals 20 connected to each sending node 10 and the short messages are transmitted through a mobile communication network to a receiving terminal 40 connected to a central receiving node 30 (S202). For example, as illustrated in FIG. 1, the sending nodes 10 generate "short message a", "short message b" and "short message c" respectively and transmit the short messages to the receiving terminal 40 connected to the central receiving node 30. The sending nodes 10 are connected to the relevant sending terminals 20 and, when setting up the whole nodes, a terminal number of the receiving terminal 40 connected to the central receiving node 30 is set up at the sending terminals 20.

After step S202, the central receiving node 30 receives the short messages from the receiving terminal 40 (S203), analyzes the relevant short messages by using a receiving parser 31 and processes calls corresponding to the relevant short messages on the basis of the information contained in the short messages analyzed by the receiving parser 31 (S204). The receiving parser 31 is configured to analyze the short messages transmitted from the receiving terminal 40, so that the central receiving node 30 recognizes information transmitted from the sending nodes 10, which is a result of the relevant analysis.

As illustrated in FIG. 1, the number of the sending nodes can be plural (N), and thus the structure of short message transmission between the central receiving node and sending nodes is the structure of 1 to N. An aspect of the related art is that, for communications between the central receiving node and sending nodes, it is okay that each sending node can be equipped with a sending generator generating short messages and the central receiving node can be equipped with a receiving parser analyzing the short messages, instead of constructing a new network. Nonetheless, the related art method and system for transmitting short messages have a problem in that the number of short messages transmitted to the central receiving node is increased as the number of sending nodes is increased, thereby increasing the central receiving node's load in processing short messages.

In other words, according to the related art method and system for transmitting short messages, the central receiving node receives short messages transmitted from each sending node and processes the short messages. Due to this, the number of short messages that should be processed by the central receiving node is increased as the number of sending nodes is increased. Message processing ability of the central receiving node is designated as a call processing speed and the call processing speed indicates the number of messages, which can be processed by the central receiving node per second. As described above, the related art method and system for transmitting short messages have a problem in that the number of short messages transmitted to the central receiving node could exceed the call processing speed of the central receiving node, if lots of short messages are transmitted to the central receiving node as the number of sending nodes is increased.

Further, according to the structure of the related art short message, the size of sending node information field is about 10 bytes and the size of data information field is below 70 bytes as illustrated in FIG. 3. If information contained in a short message is simple, the size of data information is not big, so that a short message, which amounts to about 10 bytes, can be generated and transmitted. In view of the central receiving node, both a short message of 80 bytes and a short message of 10 bytes are nothing more than one call. Thus, lots of short messages having small size is considerably ineffective in view of the central receiving node's call process.

SUMMARY OF THE INVENTION

An object of the invention is to solve at least the above problems and/or disadvantages and to provide at least the advantages described hereinafter.

The present invention achieves effective and reliable short message communication between nodes. The present invention reduces a central receiving node's load in processing short messages. In order to achieve this, a certain number of sending nodes are grouped into one sending node group. Short messages of sending nodes in the sending node group are re-configured into one short message. Thereafter, the re-configured short message is transmitted to the central receiving node.

Embodiments of the present invention provide a method of transmitting short messages using sending node grouping comprises: making a certain number of sending nodes into one sending node group and designating a representative sending node of the sending node group among the certain number of sending nodes; generating short messages and transmitting the short messages to a representative sending terminal; after receiving the short messages from the representative sending terminal and analyzing the short messages, generating reconfiguration short messages corresponding to the short messages and transmitting the reconfiguration short messages to a receiving terminal; and after receiving the reconfiguration short messages from the receiving terminal and analyzing the reconfiguration short messages, processing calls corresponding to the reconfiguration short messages.

Additionally, making sending nodes into one sending node group and designating a representative sending node, can include: making a certain number of sending nodes into one sending node group and forming a plurality of sending node groups by the same way; and designating a representative sending node separately among the sending nodes in the sending node groups and making each sending node in the relevant sending node groups recognize the relevant representative sending node.

Additionally, designating a representative sending node separately among the sending node groups and making each sending node in the sending node groups recognize the relevant representative sending node is to designate a sending node which communicates with the central receiving node first among sending nodes in the sending node group as the representative sending node and for sending nodes in the sending node group to recognize the representative sending node of the sending node group, designated among the sending nodes in the sending node group to which the sending nodes belong, through a representative node ID by communicating with the central receiving node.

Additionally, generating short messages and transmitting the short messages to a representative sending terminal, can include: checking whether the designated representative sending node is normal; generating a short message that contains information about the sending node by using a sending generator, in a case where the designated representative sending node is normal; and transmitting the generated short message to a sending terminal and transmitting the generated short message through a mobile communication network to a representative sending terminal connected to the representative sending node.

Additionally, checking whether the designated representative sending node is normal can include checking whether the representative sending node designated among sending nodes in the relevant sending node group is normal by means of communications between the representative sending node and a central receiving node.

Additionally, generating a short message and transmitting the short message to a representative sending terminal, can further include, in a case where the designated representative sending node is not normal, re-designating a representative sending node of the sending node group among the sending nodes in the sending node group and making each sending node in the relevant sending node group recognize the re-designated representative sending node.

Additionally, re-designating a representative sending node of the sending node group and making each sending node recognize the re-designated representative sending node is to re-designate a sending node of which own node ID is the smallest among normal sending nodes in the sending node group as a new representative sending node and for the sending nodes in the sending node group to recognize the representative sending node of the sending node group, re-designated among the sending nodes in the sending node group to which the sending nodes belong, through a representative node ID by communicating with the central receiving node.

Additionally, generating reconfiguration short messages corresponding to the short messages and transmitting the reconfiguration short messages to a receiving terminal, can include: judging whether a certain time has passed after receiving a first short message transmitted from the representative sending terminal or the number of short messages transmitted from the representative sending terminal reaches the certain size; in a case where the certain time has passed after receiving the first short message or the number of short messages transmitted from the representative sending terminal reaches the certain size, analyzing the transmitted short messages by using a representative sending generator and generating a reconfiguration short message corresponding to the short messages on the basis of the analyzed result; and transmitting the reconfiguration short message to the representative sending terminal and transmitting the reconfiguration short message through a mobile communication network to the receiving terminal connected to a central receiving node.

Additionally, generating a reconfiguration short message corresponding to the short messages and transmitting the reconfiguration short message to the receiving terminal, can further include receiving short messages from the representative sending terminal continuously, in a case where the certain time has not passed after receiving the first short message or the number of short messages transmitted from the representative sending terminal does not teach the certain size.

Additionally, processing calls corresponding to the reconfiguration short messages is to receive the reconfiguration short messages from the receiving terminal, to analyze the reconfiguration short messages by using a receiving parser and to process calls corresponding to the reconfiguration short messages on the basis of information contained in the reconfiguration short messages.

Further, a system for transmitting short messages using sending node grouping according to an embodiment of the present invention comprises: a plurality of sending node groups generating a reconfiguration short message using a plurality of short messages respectively and transmitting the reconfiguration short messages; and a central receiving node processing calls corresponding to the relevant reconfiguration short messages on the basis of information contained in the reconfiguration short messages.

Additionally, the sending node group can include: a plurality of sending nodes transmitting short messages that contain information about each sending node; a plurality of sending terminals, separately connected to a sending node, receiving the short messages from the relevant sending nodes and transmitting the short messages to a mobile communication network; a representative sending node transmitting the reconfiguration short message that contains information about the sending nodes; and a representative sending terminal, connected to the representative sending node, receiving the short messages through the mobile communication network from the sending terminals, receiving the reconfiguration short message from the representative sending node and transmitting the reconfiguration short message to the mobile communication network.

Additionally, the sending node can include a sending generator generating the short message. And the representative sending node can include a representative sending generator analyzing the short messages transmitted through the mobile communication network from the sending terminals and generating a reconfiguration short message corresponding to the relevant short messages.

Additionally, the central receiving node is connected to a receiving terminal receiving the reconfiguration short messages transmitted through a mobile communication network from a representative sending terminal in each sending node group.

Additionally, the central receiving node can include a receiving parser analyzing the reconfiguration short messages. And the reconfiguration short message can include: a sending node information field indicating information about the representative sending node in the sending node group; and a data information field indicating information about the sending node group.

Additionally, the sending node information field can include: a representative node ID field indicating an inherent value of the representative sending node in the sending node group; and the other information field indicating the other information about the representative sending node except the inherent value of the representative sending node.

Additionally, the data information field can include: the representative node ID field; a representative node data field indicating data transmitted from the representative sending node in the sending node group; a plurality of node ID fields indicating inherent values of each sending node in the sending node group; and a plurality of node data fields indicating data transmitted from sending nodes in the sending node group.

DETAILED DESCRIPTION OF THE PREFERRED EMBODIMENT

Figure 4:
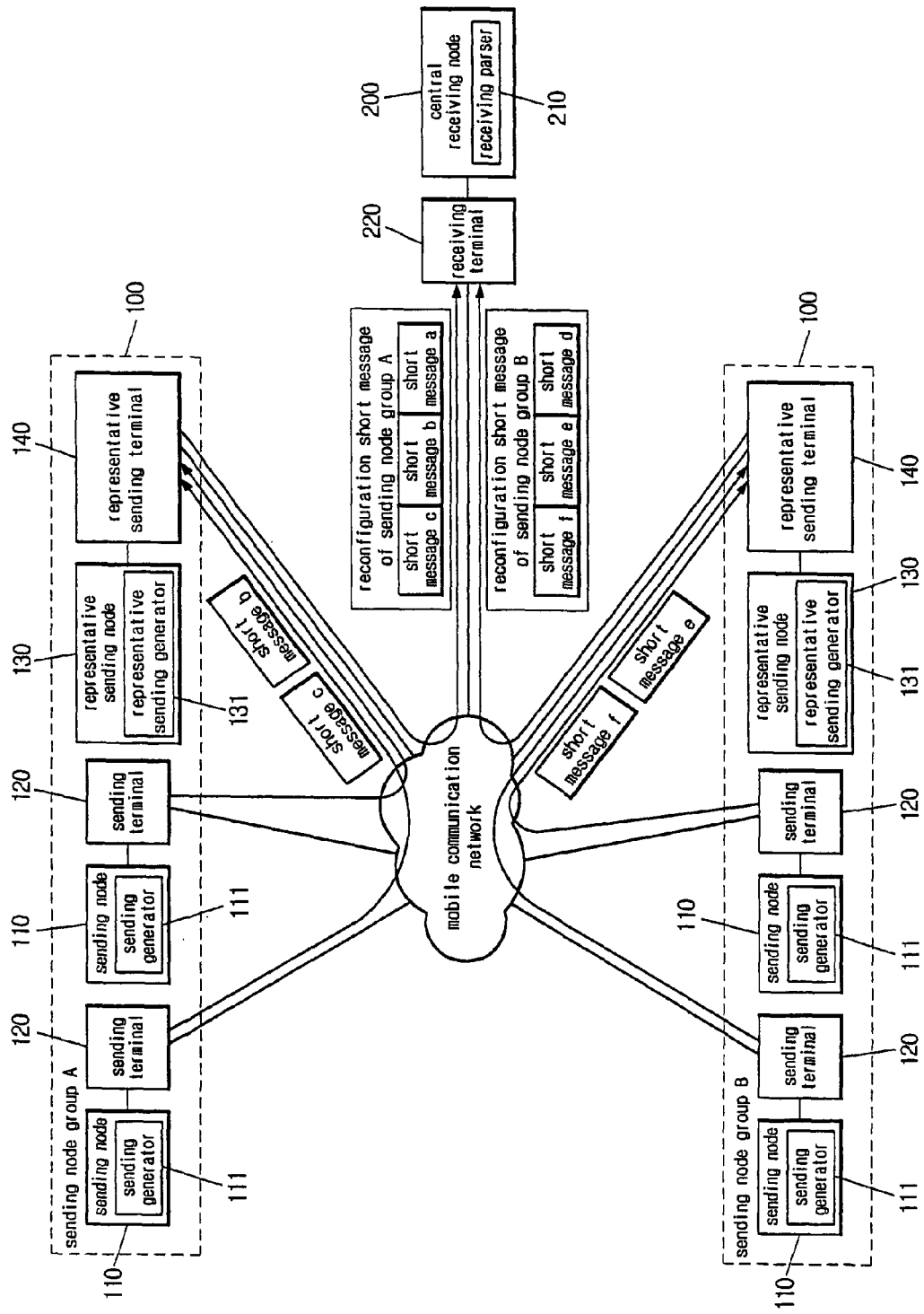
FIG. 4 illustrates the structure of a system for transmitting short messages using sending node grouping according to embodiments of the present invention.

FIG. 4 illustrates the structure of a system for transmitting short messages using sending node grouping according to embodiments of the present invention, wherein the system includes a plurality of sending node groups 100, a receiving terminal 220 and a central receiving node 200. Each sending node group 100 includes a plurality of sending nodes 110, a plurality of sending terminals 120, a representative sending node 130 and a representative sending terminal 140. Each sending node 110 includes a sending generator 111 generating a short message, thereby transmitting the short message that contains information of each sending node 110. Each sending terminal 120 is separately connected to the relevant sending node 110, receives the short message from the relevant sending node 110 and transmits the short message to a mobile communication network.

The representative sending node 130 includes a representative sending generator 131. The short messages transmitted through the mobile communication network from the sending terminals 120 are analyzed and a reconfiguration short message corresponding to the short messages is generated. Thereby, the reconfiguration short message that contains information about the sending nodes 110 in the relevant sending node group 100 is transmitted to the representative sending terminal 140. The representative sending terminal 140 connected to the representative sending node 130, receives short messages through the mobile communication network from the sending terminals 120, receives a reconfiguration short message from the representative sending node 130, and transmits the reconfiguration short message to the mobile communication network.

The receiving terminal 220 receives the reconfiguration short messages transmitted through the mobile communication network from the representative sending terminal 140 in each sending node group 100. Further, the central receiving node 200 includes a receiving parser 210 that analyzes the reconfiguration short messages transmitted from the receiving terminal 220. The central receiving node 200 is connected to the receiving terminal 220, thereby processing calls corresponding to the reconfiguration short messages on the basis of information contained in the reconfiguration short messages analyzed by the receiving parser 210.

Figure 5:
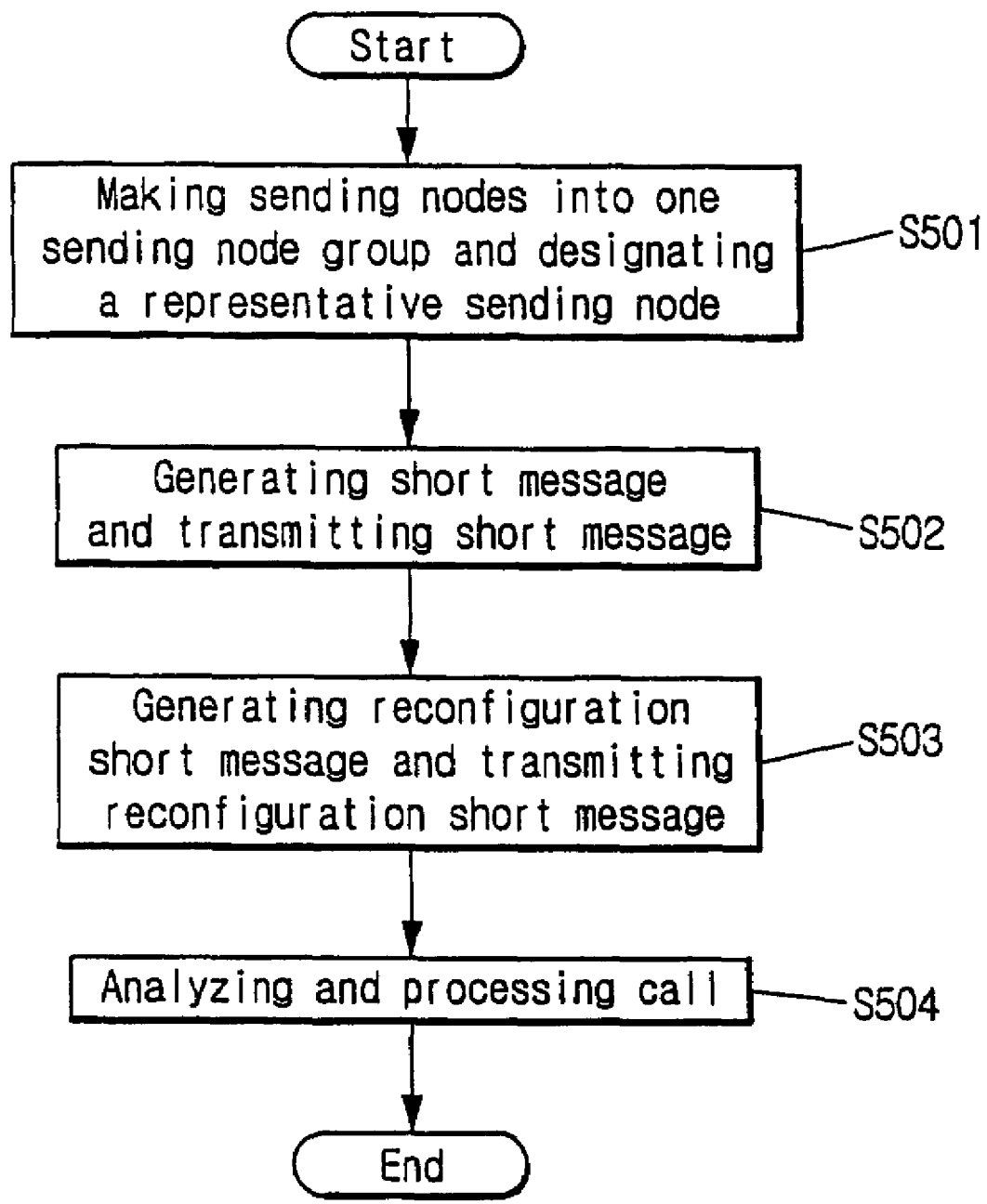
FIG. 5 is a flow chart illustrating the method of transmitting short messages using sending node grouping according to embodiments of the present invention.

Hereinafter, a method of transmitting short messages using sending node grouping according to embodiments of the present invention will be explained with reference to FIG. 5. FIG. 5 is a flow chart illustrating a method of transmitting short messages using sending node grouping. A central receiving node 200 makes a certain number of sending nodes 110 into one sending node group and designates a representative sending node 130 from each sending node group 100 (S501). Each sending node 110 generates a short message and transmits the short message to a relevant representative sending terminal 140 (S502).

The representative sending node 130 receives the short messages from the representative sending terminal 140, analyzes the short messages, generates a reconfiguration short message corresponding to the short messages and transmits the reconfiguration short message to the receiving terminal 220 (S503). The central receiving node 200 receives the reconfiguration short messages from the receiving terminal 220, analyzes the reconfiguration short messages and processes calls corresponding to the reconfiguration short messages (S504).

Figure 6:
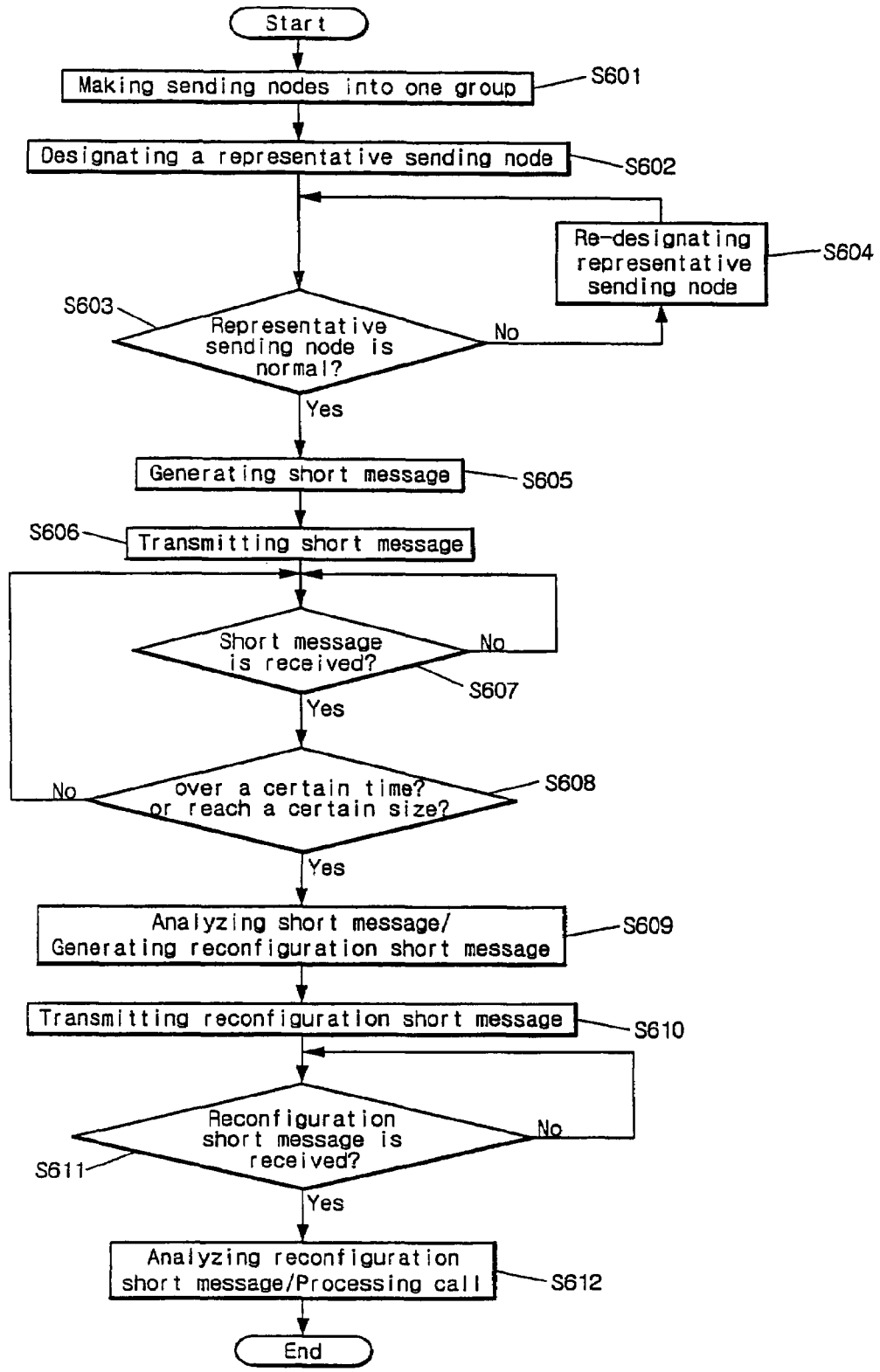
FIG. 6 is a flow chart that illustrates a method of transmitting short messages using sending node grouping according to embodiments of the present invention.

Hereinafter, the method of transmitting short messages using sending node grouping according to embodiments of the present invention will be explained specifically with reference to FIG. 6. FIG. 6 is a flow chart that specifically illustrates the method of transmitting short messages using sending node grouping according to embodiments of the present invention. Hereinafter, said making a certain number of sending nodes into one sending node group and designating a representative sending node (S501) will be specifically explained.

The central receiving node 200 makes a certain number of sending nodes 110 into one sending node group, thereby forming a plurality of sending node groups 100 (S601). At this time, the central receiving node 200 adjusts the number of sending nodes 110 which belong to one sending node group appropriately.

Further, the central receiving node 200 designates a representative sending node 130 among sending nodes in each sending node group 100 and makes each sending node in the relevant sending node groups 100 recognize the representative sending node 130 (S602). In other words, the central receiving node 200 selects a node, which communicates with the central receiving node first, from sending nodes 110 in the sending node group 100 as the representative sending node 130. The sending nodes 110 in the sending node group 100 communicate with the central receiving node 200, so that the sending nodes 110 recognize the representative sending node, designated from the sending node group 100 to which the sending nodes 110 belong, by a representative node ID.

Hereinafter, said generating the short message and transmitting the short message (S502) will be specifically explained. After step S602, the central receiving node 200 checks whether the designated representative sending node 130 is normal (S603). In a case where the designated representative sending node is not normal as a result of said checking (S603), the central receiving node 200 re-designates a representative sending node 130 among sending nodes in the sending node group 100 and makes each sending node 110 in the sending node group 100 recognize the re-designated representative sending node (S604). Specifically, the central receiving node 200 detects the fact that the representative sending node 130 is not normal (e.g., a failure has occurred) and re-designates another node (e.g., a node that has the smallest node ID) as a new representative sending node 130 among normal sending nodes 110 in the sending node group 100. Further, the sending nodes 110 in the sending node group 100 communicate with the central receiving node 200, so that the sending nodes 110 recognize the representative sending node, re-designated among the sending nodes in the sending node group 100 to which the sending nodes 110 belong, by a representative node ID.

Figure 3:
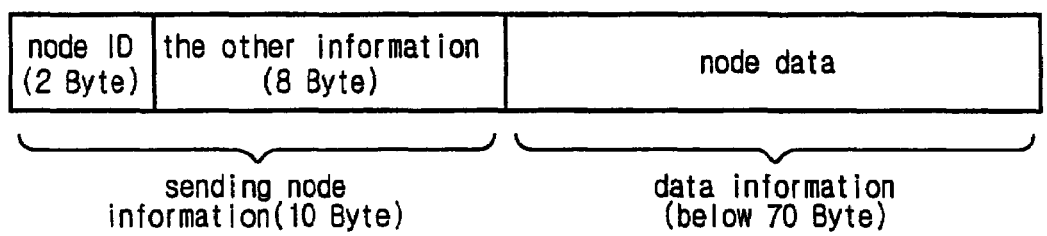
FIG. 3 illustrates the structure of the related art short message.

On the other hand, in a case where the designated representative sending node 130 is normal as a result of said checking (S603), each sending node 110 generates a short message which contains information of each sending node by using a relevant sending generator 111 (S605). Specifically, the central receiving node 200 checks that the representative sending node 130 of the sending node group, designated among the sending nodes 110 in the sending node group 100, is normal by communicating with the representative sending node 130. And, each sending node 110 transforms information about each sending node into a short message using the relevant sending generator 111 provided in each sending node 110. The structure of the generated short message is the same as that of the related art short message illustrated in FIG. 3, so that explanation will be omitted.

Further, the sending nodes 110 transmit the generated short messages to each sending terminal 120. Each sending terminal 120 transmits the generated short messages through the mobile communication network to a representative sending terminal 140 connected to a representative sending node in the sending node group 100 (S606). Here, the sending nodes 110 transmit the generated short message to the representative sending terminal according to a representative node ID, recognized by communications with the central receiving node 200, of the representative sending node 130. For example, sending nodes 110 in a sending node group A generate a "short message b" and a "short message c", and transmit the "short message b" and the "short message c" to a representative sending terminal 140 connected to a representative sending node 130 in the sending node group A. In the same manner, sending nodes in a sending node group B generate a "short message e" and a "short message f", and transmit the "short message e" and the "short message f" to a representative sending terminal connected to a representative sending node in the sending node group B.

Hereinafter, said generating the reconfiguration short message corresponding to the short messages and transmitting the reconfiguration short message to the receiving terminal 220 (S503) will be specifically explained. After step S606, the representative sending node 130 receives the short messages from the representative sending terminal 140 (S607). The representative sending node 130 judges whether a certain time has passed after receiving a first short message transmitted from the representative sending terminal 140 or the number of short messages transmitted from the representative sending terminal 140 reaches the certain size (S608).

In other words, the representative sending node 130 waits to receive another short message transmitted from the sending nodes in the relevant sending node group 100 for a certain time (for example, 5 seconds). And, the representative sending node 130 checks whether the number of short messages transmitted from the representative sending terminal reaches the certain size (for example, 80 bytes). This is because the number of the received short messages needs to be limited in order for the size of reconfiguration short message, which will be newly configured corresponding to the received short messages not to exceed the certain size.

In a case where the certain time has not passed after receiving the first short message or the number of short messages transmitted from the representative sending terminal does not reach the certain size as a result of said judging (S608), the representative sending node 130 receives short messages from the representative sending terminal in a continuous way (S607). In other words, the representative sending node 130 continuously receives short messages until the certain time has passed after receiving the first short message or the number of transmitted short messages reaches the certain size.

On the other hand, in a case where the certain time has passed after receiving the first short message or the number of transmitted short messages reaches the certain size as a result of said judging (S608), the representative sending node 130 analyzes the received short messages by using a representative sending generator 131. Then, the representative sending node 130 generates a reconfiguration short message corresponding to the short messages on the basis of the analyzed result (S609).

Figure 7:
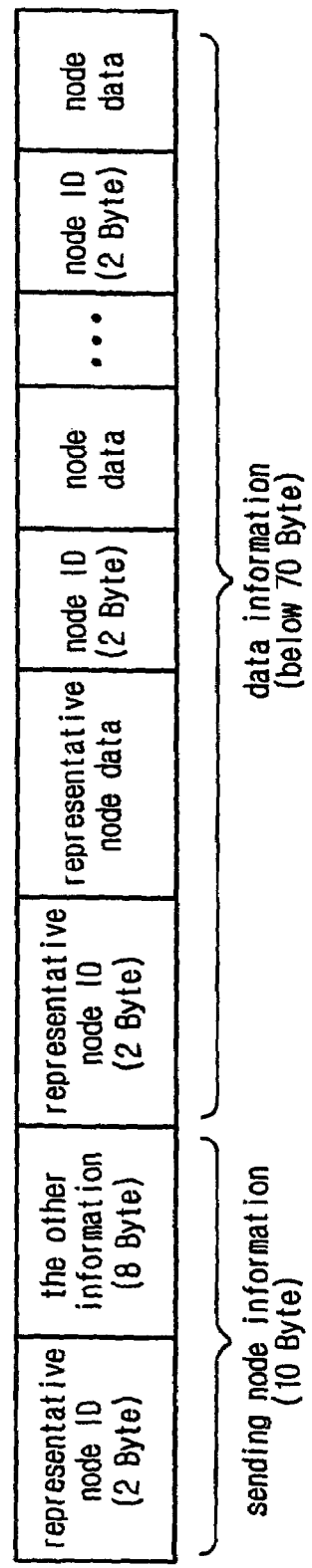
FIG. 7 illustrates the structure of a reconfiguration short message corresponding to short messages according to embodiments of the present invention.

FIG. 7 illustrates the structure of the reconfiguration short message according to embodiments of the present invention. The reconfiguration short message corresponding to the short messages includes a sending node information field and a data information field. The sending node information field includes a representative node ID field indicating an inherent value of the representative sending node 130 in the sending node group 100 and the other information field indicating the other information about the representative sending node except the inherent value of the representative sending node. The data information field indicates information about the sending node group 100 and includes: the representative node ID field; a representative node data field indicating data transmitted from the representative sending node 130 in the sending node group 100; a plurality of node ID fields indicating inherent values of sending nodes 110 in the sending node group 100; and a plurality of node data fields indicating data transmitted from the sending nodes 110 in the sending node group 100.

The size of the sending node information field is 10 bytes. The size of the representative node ID field is 2 bytes and the size of the other information field is 8 bytes at least. The size of the other information field is variable and the size of the data information field amounts to 70 bytes at most. The size of the node ID field is 2 bytes. The size of the representative node data field and node data field can be different depending on the type of the nodes, and the representative node data field and node data field depend on the nodes. Nonetheless, the size of the representative node data field and node data field should be fixed to a certain size in order for a receiving parser 210 of the central receiving node 200 to analyze the reconfiguration short messages without extra information for identifying fields.

After step S609, the representative sending node 130 transmits the generated reconfiguration short message to the representative sending terminal 140 and the representative sending terminal 140 transmits the reconfiguration short message through the mobile communication network to a receiving terminal 220 connected to the central receiving node 200 (S610). The representative sending node 130 is connected to the representative sending terminal 120 and, when setting up the whole nodes, a terminal number of the receiving terminal 220 connected to the central receiving node 200 is set up at the representative sending terminal.

For example, as illustrated in FIG. 4, a representative sending node in a sending node group A generates a "reconfiguration short message of the sending node group A" including: a "short message b" transmitted from a sending node in the sending node group A; a "short message c" transmitted from another sending node in the sending node group A; and a "short message a" generated by the representative sending node in the sending node group A. The representative sending node in the sending node group A transmits the reconfiguration short message to a receiving terminal 220 connected to a central receiving node 200.

In the same manner, a representative sending node in a sending node group B generates a "reconfiguration short message of the sending node group B" comprising: a "short message e" transmitted from a sending node in the sending node group B; a "short message f" transmitted from another sending node 110 in the sending node group B; and a "short message d" generated by the representative sending node in the sending node group B. The representative sending node 130 in the sending node group B transmits the reconfiguration short message, generated by the representative sending node in the sending node group B, to the receiving terminal 220 connected to the central receiving node 200.

Hereinafter, said analyzing the reconfiguration short messages and processing calls corresponding to the reconfiguration short messages (S504) will be specifically explained. After step S610, the central receiving node 200 receives the reconfiguration short messages from the receiving terminal 220 (S611), analyzes the reconfiguration short messages using a receiving parser 210 and processes calls corresponding to the reconfiguration short messages on the basis of information contained in the analyzed reconfiguration short messages (S612). The receiving parser 210 is configured to analyze the received reconfiguration short messages and thus, the central receiving node 200 recognizes the analyzed results, namely, information transmitted from the representative sending node 130.

Figure 1:
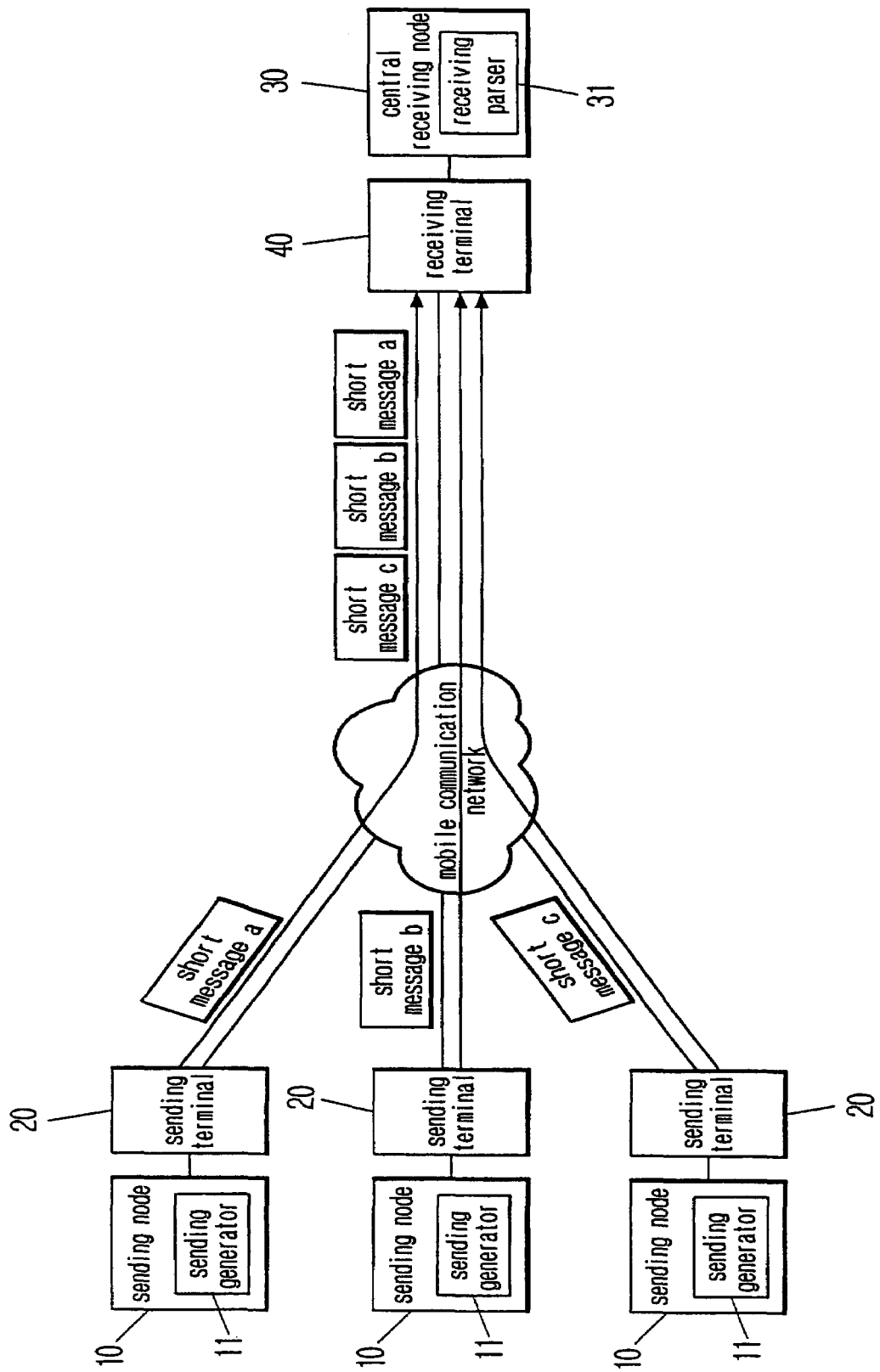
FIG. 1 illustrates the structure of the related art system for transmitting short messages.
Figure 2:
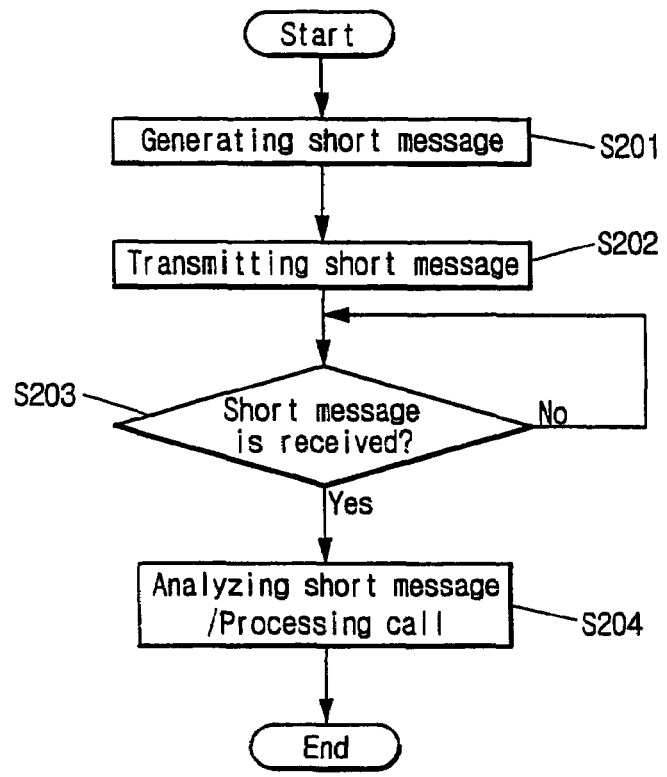
FIG. 2 is a flow chart illustrating the related art method of transmitting short messages.

Hereinafter, the related art and an embodiment of the present invention will be compared with reference to the specified example. First, assuming that the total number of sending nodes is 1,000, the number of each sending node's short message transmission per one day is 50 and the size of data transmitted from sending nodes is 5 bytes. Then, according to the related art which has the structure illustrated in FIG. 1, the total number of short messages that a central receiving node 30 receives per one day is 50,000 {(the total number of sending nodes 10)×(the number of each sending node's short message transmission per one day)=(the total number of short messages that the central receiving node 30 receives per one day), namely, 1000× 50=50,000}. If the 50,000 short messages are transmitted to the central receiving node 30 at appropriate intervals, no problem can happen. On the contrary, if a plurality of short messages, namely, short messages that exceed a call processing speed of the central receiving node 30 are transmitted without appropriate intervals, loss of short messages can happen.

On the other hand, according to the embodiments of the present invention which have the structure illustrated in FIG. 4, the number of sending nodes that each sending node group 100 can include is 10 [(the size of a data information field)/{(the size of a (representative) node ID field)+(the size of a (representative) node data field)}=(the number of sending nodes that each sending node group can include), specifically, "70 bytes/(2 bytes+5 bytes)=10"]. The relevant 10 sending nodes are grouped into one sending node group 100 and a representative sending node 130 in the sending node group 100 transmits to a central receiving node 200 only one reconfiguration short message re-configured by the representative sending node 130.

Further, according to the embodiments of the present invention, the total number of short messages that the central receiving node 200 receives per one day is 5,000 [{(the total number of sending nodes)/(the number of sending nodes that each sending node group can include)}×(the number of each sending node's short message transmission per one day)= (the total number of short messages that the central receiving node receives per one day), specifically, "(1,000/10)×50=5, 000"], thereby transmitting much smaller number (5,000) of reconfiguration short messages, compared with the number of short messages transmitted according to the related art, to the central receiving node 200.

According to the related art, in a case where each sending node 10 generates one short message and transmits the short message to the central receiving node 30, the central receiving node 30 receives short messages equivalent to the number of sending nodes. Thus, according to the related art, the probability of exceeding a call processing speed of the central receiving node 30 is comparatively high.

On the other hand, according to the embodiments of the present invention, each sending node 110 generates a short message and transmits the short message to a representative sending node 130 in a sending node group 100. The representative sending node that receives the short messages analyzes the short messages using a representative sending generator 131, configures new short message, namely, one reconfiguration short message on the basis of the analyzed result and transmits the reconfiguration short message to a central receiving node 200. Thus, the central receiving node 200 receives short messages equivalent to the number of sending node groups, so that the probability of exceeding call processing speed of the central receiving node 200 is reduced comparatively.

The foregoing embodiments and advantages are merely exemplary and are not to be construed as limiting the present invention. The present teaching can be readily applied to other types of apparatuses. Accordingly, the description of the present invention is intended to be illustrative, and not to limit the scope of the claims. Many alternatives, modifications and variations will be apparent to those skilled in the art.

What is claimed is:

1. A method of communicating using sending node grouping, comprising:
    grouping a plurality of sending nodes into one sending node group and designating one of the sending nodes as a representative sending node of the sending node group;
    generating short messages and transmitting the short messages to a representative sending terminal; and
    generating a reconfiguration short message corresponding to the short messages.

2. The method of claim 1, further comprising:
    transmitting the reconfiguration short message to a receiving terminal; and
    processing communications corresponding to the reconfiguration short message received at the receiving terminal.

3. The method of claim 1, further comprising:
    grouping at least one additional sending node group from additional sending nodes; and
    designating a representative sending node for each additional sending node group and making each sending node in each sending node group recognize the representative sending node within each group.

4. The method of claim 3, wherein said designating a representative sending node separately among the sending node groups comprises:
    designating a sending node, which first communicates with a central receiving node among sending nodes in the sending node group, as the representative sending node; and
    making sending nodes in the sending node group recognize the representative sending node of the sending node group, designated among the sending nodes in the sending node group to which the sending nodes belong, through a representative node ID by communicating with the central receiving node.

5. The method of claim 1, wherein said generating short messages and transmitting the short messages to a representative sending terminal, comprises:
    checking whether the representative sending node is normal;
    generating a short message that contains information about the sending node by using a sending generator, if the representative sending node is normal; and
    transmitting the generated short message to a sending terminal and transmitting the generated short message through a mobile communication network to the representative sending terminal connected to the representative sending node.

6. The method of claim 5, wherein said checking whether the designated representative sending node comprises:
    checking whether the representative sending node designated among sending nodes in the sending node group is normal using communications between the representative sending node and a central receiving node.

7. The method of claim 5, wherein said generating a short message and transmitting the short message to a representative sending terminal, further comprises, in a case where the designated representative sending node is not normal, re-designating another sending node of the sending node group as the representative sending node and making each sending node in the sending node group recognize the re-designated sending node as the representative sending node.

8. The method of claim 7, wherein said re-designating a representative sending node further comprises: re-designating the sending node that has the smallest node ID among normal sending nodes in the sending node group as the representative sending node and for the sending nodes in the sending node group to recognize the representative sending node of the sending node group, re-designated among the sending nodes in the sending node group to which the sending nodes belong, through a representative node ID by communicating with the central receiving node.

9. The method of claim 1, wherein said generating a reconfiguration short message corresponding to the short messages, comprises:
    judging whether a predetermined time has passed after receiving a first short message transmitted from the representative sending terminal or the number of short messages transmitted from the representative sending terminal reaches a predetermined size; and
    in a case where the predetermined time has passed after receiving the first short message or the number of short messages transmitted from the representative sending terminal reaches the predetermined size, analyzing the transmitted short messages by using a representative sending generator and generating the reconfiguration short message corresponding to the short messages on the basis of the analyzed result.

10. The method of claim 2, wherein said transmitting the reconfiguration short message to a receiving terminal, comprises: transmitting the reconfiguration short message through a mobile communication network to the receiving terminal connected to a central receiving node.

11. The method of claim 9, wherein said generating a reconfiguration short message corresponding to the short messages, further comprises:
receiving short messages from the representative sending terminal continuously, in a case where the predetermined time has not passed after receiving the first short message or the number of short messages transmitted from the representative sending terminal does not reach the predetermined size.

12. The method of claim 2, wherein said processing communications corresponding to the reconfiguration short message comprises:
analyzing the reconfiguration short message by using a receiving parser and to process communications corresponding to the reconfiguration short message on the basis of information contained in the reconfiguration short message.

13. The method of claim 1, wherein the reconfiguration short message comprises:
a sending node information field configured to indicate information about the representative sending node in the sending node group; and
a data information field configured to indicate information about the sending node group.

14. The method of claim 13, wherein the sending node information field comprises:
a representative node ID field configured to indicate an ID of the representative sending node in the sending node group; and
an other information field configured to indicate other information about the representative sending node.

15. The method of claim 13, wherein the data information field comprises:
a representative node ID field;
a representative node data field configured to indicate data transmitted from the representative sending node in the sending node group;
a plurality of node ID fields configured to indicate IDs of each sending node in the sending node group; and
a plurality of node data fields configured to indicate data transmitted from sending nodes in the sending node group.

16. A system for communicating using sending node grouping, comprising:
at least one sending node group configured to generate a reconfiguration short message using a plurality of short messages and to transmit the reconfiguration short message.

17. The system of claim 16, further comprising:
a central receiving node configured to process communications corresponding to the reconfiguration short message on the basis of information contained in the reconfiguration short message.

18. The system of claim 16, wherein the sending node group comprises:
a plurality of sending nodes configured to transmit short messages that contain information about each sending node;
a plurality of sending terminals, each sending terminal connected to a corresponding sending node, configured to receive the short messages from the corresponding sending nodes and to transmit the short messages to a mobile communication network;
a representative sending node configured to transmit the reconfiguration short message that contains information about the sending nodes; and
a representative sending terminal, connected to the representative sending node, configured to receive the short messages through the mobile communication network from the sending terminals, to receive the reconfiguration short message from the representative sending node, and to transmit the reconfiguration short message to the mobile communication network.

19. The system of claim 18, wherein each sending node comprises a sending generator configured to generate the short messages.

20. The system of claim 18, wherein the representative sending node comprises a representative sending generator configured to analyze the short messages transmitted through the mobile communication network from the sending terminals and to generate a reconfiguration short message corresponding to the short messages.

21. The system of claim 17, wherein the central receiving node is connected to a receiving terminal configured to receive the reconfiguration short message transmitted through a mobile communication network from a representative sending terminal in each sending node group.

22. The system of claim 17, wherein the central receiving node comprises a receiving parser configured to analyze the reconfiguration short message.

23. The system of claim 16, wherein the reconfiguration short message comprises:
a sending node information field configured to indicate information about the representative sending node in the sending node group; and
a data information field configured to indicate information about the sending node group.

24. The system of claim 23, wherein the sending node information field comprises:
a representative node ID field configured to indicate an ID of the representative sending node in the sending node group; and
an other information field configured to indicate other information about the representative sending node.

25. The system of claim 23, wherein the data information field comprises:
a representative node ID field;
a representative node data field configured to indicate data transmitted from the representative sending node in the sending node group;
a plurality of node ID fields configured to indicate IDs of each sending node in the sending node group; and
a plurality of node data fields configured to indicate data transmitted from sending nodes in the sending node group.

26. The system of claim 16, wherein the reconfiguration short message has a maximum size of less than or equal to 160 bytes.

27. The system of claim 16, wherein the system is at least one of Global System for Mobile communication (GSM), Code Division Multiple Access (CDMA) and Personal Communication Service (PCS).

28. The method of claim 1, wherein the reconfiguration short message has a maximum size of less than or equal to 160 bytes.

29. The method of claim 1, wherein the communication method uses at least one of Global System for Mobile communication (GSM), Code Division Multiple Access (CDMA) and Personal Communication Service (PCS).

30. A system for communicating using sending node grouping, comprising:

a central receiving node configured to process communications corresponding to a reconfiguration short message on the basis of information contained in the reconfiguration short message, wherein the reconfiguration short message is generated using a plurality of short messages from a plurality of sending nodes in a sending node group.

31. A method of communicating using sending node grouping, comprising:

processing communications corresponding to a reconfiguration short message received at a receiving terminal on the basis of information contained in the reconfiguration short message, wherein the reconfiguration short message is generated using a plurality of short messages from a plurality of sending nodes in a sending node group.

32. A representative sending unit comprising:

a sending node and sending terminal configured to generate a reconfiguration short message using a plurality of short messages received from other sending nodes in a sending node group and to transmit the reconfiguration short message.

33. The method of claim 1, wherein the representative sending node and representative sending terminal are integrated into one device.

* * * * *